United States Patent
Fork et al.

[15] 3,704,961
[45] Dec. 5, 1972

[54] CONTROL SYSTEM FOR A CYCLOID PROPELLER FOR SHIPS

[72] Inventors: Kurt Fork, Frauenaurach; Werner Fork, Bremen-Arsten, both of Germany

[73] Assignee: Siemens Aktiengesellschaft, Berlin, Munich, Germany

[22] Filed: June 15, 1971

[21] Appl. No.: 153,210

[30] Foreign Application Priority Data

June 18, 1970 Germany...............P 20 29 995.0

[52] U.S. Cl. ........................................... 416/111
[51] Int. Cl. ............................................ B63h 1/10
[58] Field of Search ..................... 416/108, 110, 111

[56] References Cited

UNITED STATES PATENTS 3,241,618  3/1966  Baer.........................416/108 UX

FOREIGN PATENTS OR APPLICATIONS 898,406  11/1953  Germany.........................416/108

*Primary Examiner*—Everette A. Powell, Jr.
*Attorney*—Curt M. Avery et al.

[57] ABSTRACT

A servo motor controlled by a speed control lever and a servo motor controlled by a steering wheel adjust the position of the control point of the pivoted blades of a cycloid propeller in two directions. The control connection between the lever and the servo motor controlled thereby includes a first signal transmitter and the control connection between the wheel and the servo motor controlled thereby includes a second signal transmitter. The signal provided by the first signal transmitter is controlled as a function of a function generator supplied with the signal provided by the second transmitter.

4 Claims, 4 Drawing Figures

CONTROL SYSTEM FOR A CYCLOID PROPELLER FOR SHIPS

DESCRIPTION OF THE INVENTION

The invention relates to a control system for a cycloid propeller. More particularly, the invention relates to a control system for a cycloid propeller, especially for ships, in which a servo motor controlled by a speed control lever and a servo motor controlled by a steering wheel adjust the position of the control point of the pivoted blades in two directions.

Cycloid propellers which are used in ships and of which good maneuverability is required such as, for example, ferry boats, tugs, inland passenger ships, etc., have a wheel structure which is driven around a vertical shaft and near the circumference of which pivoted blades are arranged which are immersed in the surrounding water. The pivoted blades are supported in pivot bearings and during a revolution of the wheel structure are controlled approximately so that the normal to the blade surface, erected on the axis of rotation, always goes through one and the same point, the so-called control point. This control point can be shifted around as to its position relative to the axis of the wheel structure by means of a control stick in order to change the speed and the direction of travel or steering angle of the ship. This purpose is served by the servo motors which are controlled by the speed control lever and the steering wheel and which adjust the position of the control point of the pivoted blades in two mutually perpendicular directions via a blade drive linkage. In the known type of structure of cycloid propellers, as described, for example, in German Pat. No. 709,545, only the speed component is controlled by one servo motor and only the steering component is controlled by the other servo motor.

If, for example, the control point is situated on the axis of rotation of the wheel structure, which is driven at constant speed, all the pivoted blades remain at rest relative to the wheel structure as said wheel structure rotates. The developed propeller thrust is zero. If the control point is displaced relative to the axis of rotation, that is, if it is eccentric to said axis of rotation, the pivoted blades carry out an oscillatory motion, whereby positive thrust forces are produced at the cycloid propeller. The magnitude of the positive thrust forces is the result of the selected eccentricity of the control point. The direction of the positive thrust forces results from the direction of the eccentricity. By geometric addition of the positioning travel of the two servo motors, thrust forces may be obtained at any desired angle relative to the ship's axis. The direction of the eccentricity of the control point forms a definite angle with respect to the direction of the thrust developed by the cycloid propeller, which depends on the design of the blade drive linkage.

If it is desired to adjust by means of a servo motor an eccentricity of the control point which would result in a thrust along the longitudinal axis of the ship, such servo motor would have to form a definite angle, independent of the type of blade drive linkage, relative to the longitudinal axis of the ship. Thus, it has heretofore been necessary in designing a cycloid propeller to take such angle into consideration. It has also been necessary to consider the arrangement of the drive motor in the ship and to arrange the servo motors and the drive shaft at different mutual angular positions. This involves practically a new design for each application.

Mechanical linkages have been proposed by means of which it is possible to form the eccentricity of the control point from the positioning travel of both servo motors, even if only the speed lever or only the steering wheel is actuated. Although the need to arrange the servo motors at a definite angle with respect to the longitudinal axis of the ship is eliminated thereby, mechanical linkages which are difficult to accommodate are required between the command post such as, for example, the bridge, and the cycloid propeller, which is usually a great distance away.

The maximum permissible value of the eccentricity for the speed is derived from the selected eccentricity for the steering thrust, where the resultant of the eccentricities, taking into consideration the permissible load on the drive motor, describes a figure similar to an ellipse.

Furthermore, the proposed mechanical control linkage only permits the realization of specific definite interdependencies of steering and speed control commands. The control is also sensitive to acceleration and must be constructed for each propeller size from components of different size. This results in relatively high costs, since mass production is impossible.

An object of our invention is to create a control for a cycloid propeller in which the advantageous properties of the proposed control may be attained without the burden of their shortcomings.

An object of the invention is to provide a control system for a cycloid propeller which may utilize mass-produced, non-moving parts, which may be the same for any propeller size, to provide with great accuracy a desired interdependency of the control point eccentricities for the travel thrust and the rudder force.

Another object of the invention is to provide a control system for a cycloid propeller which does not require special runs.

Another object of the invention is to provide a control system for a cycloid propeller which is largely free of wear, insensitive to shock and suitable for connection to automatic steering installations.

In accordance with the invention, control connection is established between the speed control lever and the steering wheel and the servo motors, each via an electrical signal transmitter. The signal of the transmitter associated with the speed control lever is controlled as a function of a function generator supplied by the transmitter of the steering wheel. In this manner, it is possible, by using mass-produced, non-moving parts, especially electronic components, which may be the same for cycloid propellers of any size, to bring into a desired interdepencey with each other, with great accuracy, the control point eccentricities for the travel thrust and the rudder force. Special runs are therefore no longer necessary. The control of our invention is furthermore largely free of wear, insensitive to shock, and is suitable for connection to automatic steering installations. The control of the invention maybe combined with additional control circuits.

In accordance with the invention, a control system for a cycloid propeller having pivoted blades having a control point, first and second servo motors, a speed control lever controlling the first servo motor and a steering wheel controlling the second servo motor to adjust the position of the control point of the blades in two directions comprises a first control connection between the lever and the first servo motor. The first control connection includes a first signal transmitter for producing a first signal. A second control connection is provided between the wheel and the second servo motor. The second control connection includes a second signal transmitter for producing a second signal. A function generator controls the first signal as a function of the function generator. The second signal is supplied to the function generator.

The first control connection includes a multiplier having one input connected to the first signal transmitter and another input coupled to the second signal transmitter via the function generator.

Each of the first and second servo motors has an axis and the blades have a direction of eccentricities for a straight ahead course. The first control connection includes computer means and the second control connection includes computer means for computing the relations $x \cos \gamma + y \sin \gamma$ and
$-x \sin \gamma + y \cos \gamma$ wherein $\gamma$ is the angle between the axis of one of the first and second servo motors and the direction of eccentricities for a straight ahead course.

In order that the invention may be readily carried into effect, it will now be described with reference to the accompanying drawings, wherein.

Figure 1:
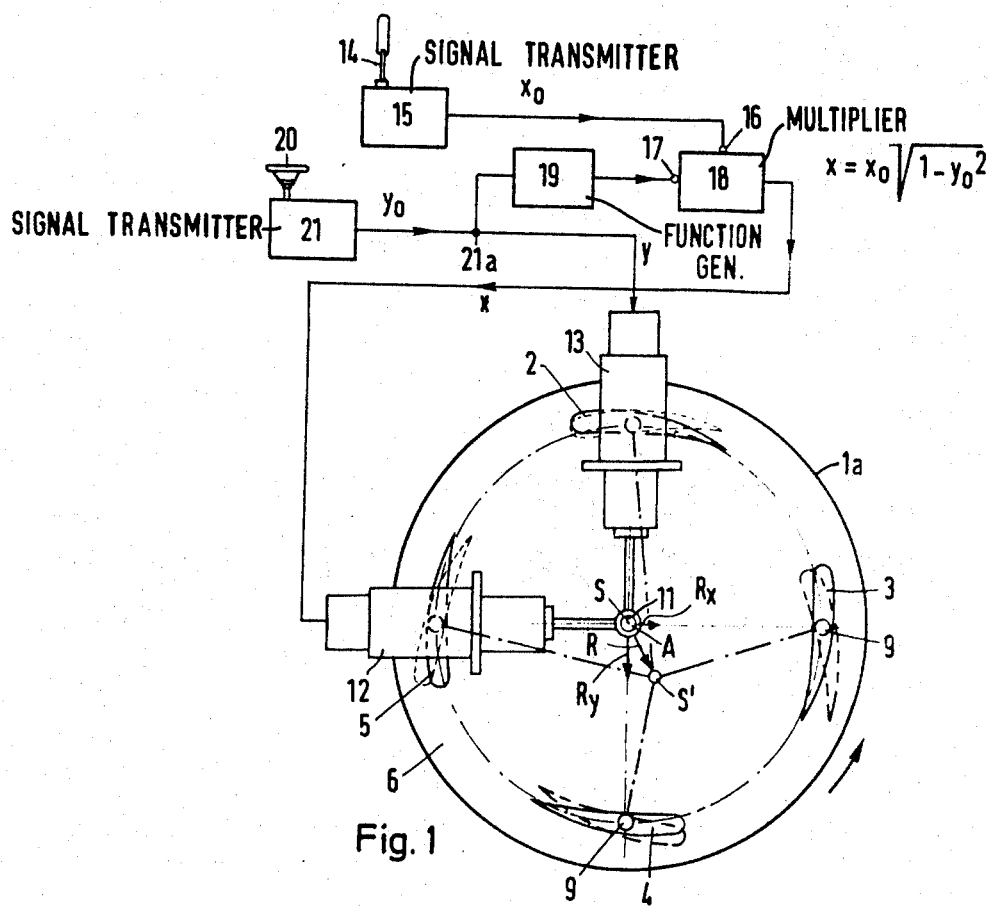
FIG. 1 is a block diagram of an embodiment of the control system of the invention with the cycloid propeller illustrated schematically.
Figure 2:
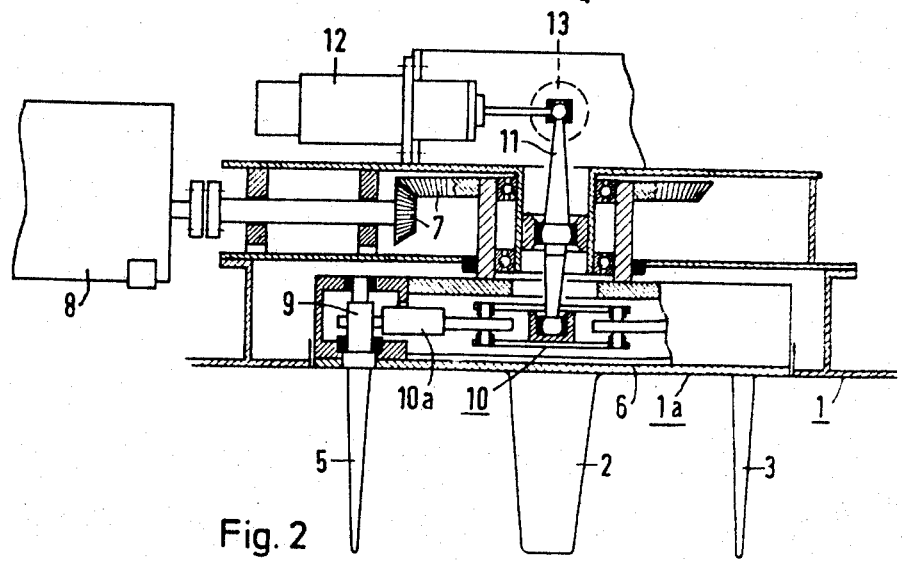
FIG. 2 is a schematic side view, partly in section, of a cycloid propeller.

In FIG. 1, a cycloid propeller 1a has a driven wheel structure 6 having pivoted blades 2 to 5 and is rotatably installed at the bottom of a vessel 1 (FIG. 2). The wheel structure may rotate about an axis of rotation A and is driven by a drive motor 8 via a gear drive 7 (FIG. 2). Pivot pins 9 of the pivoted blades 2 to 5 are supported in holes of the wheel structure 6 and are guided during their rotation by a crank drive 10 in such a manner that a perpendicular erected in the axis of rotation on the contour surface of the pivoted blade extends approximately through a control point S. As shown in FIG. 2, the crank drive 10 constitutes, for practical purposes, a blade drive linkage 10a which is hinged at the control point S and is connected to the pivot pin 9.

In order to change the speed and the rudder angle, the control point S is positioned by two mutually perpendicular servo motors 12 and 13 via a control stick 11 into a position S', which is eccentric to the axis of rotation A of the wheel structure 6, shown by broken lines. By geometric addition of the positioning travel of the two servo motors 12 and 13, thrust forces at any desired angle relative to the ship's axis may be obtained. The ship may thereby be moved in any direction.

In the control system of the invention, a speed control lever 14 has a corresponding first electrical signal transmitter 15 which is connected in a first control connection, via an input 16 of a multiplier 18, to the first servo motor 12. A second input 17 of the multiplier 18 is connected via a function generator 19 to the output 21a of a second electrical signal transmitter 21 which is operated by a steering wheel 20 and is connected in a second control connection to the second servo motor 13.

Figure 3:
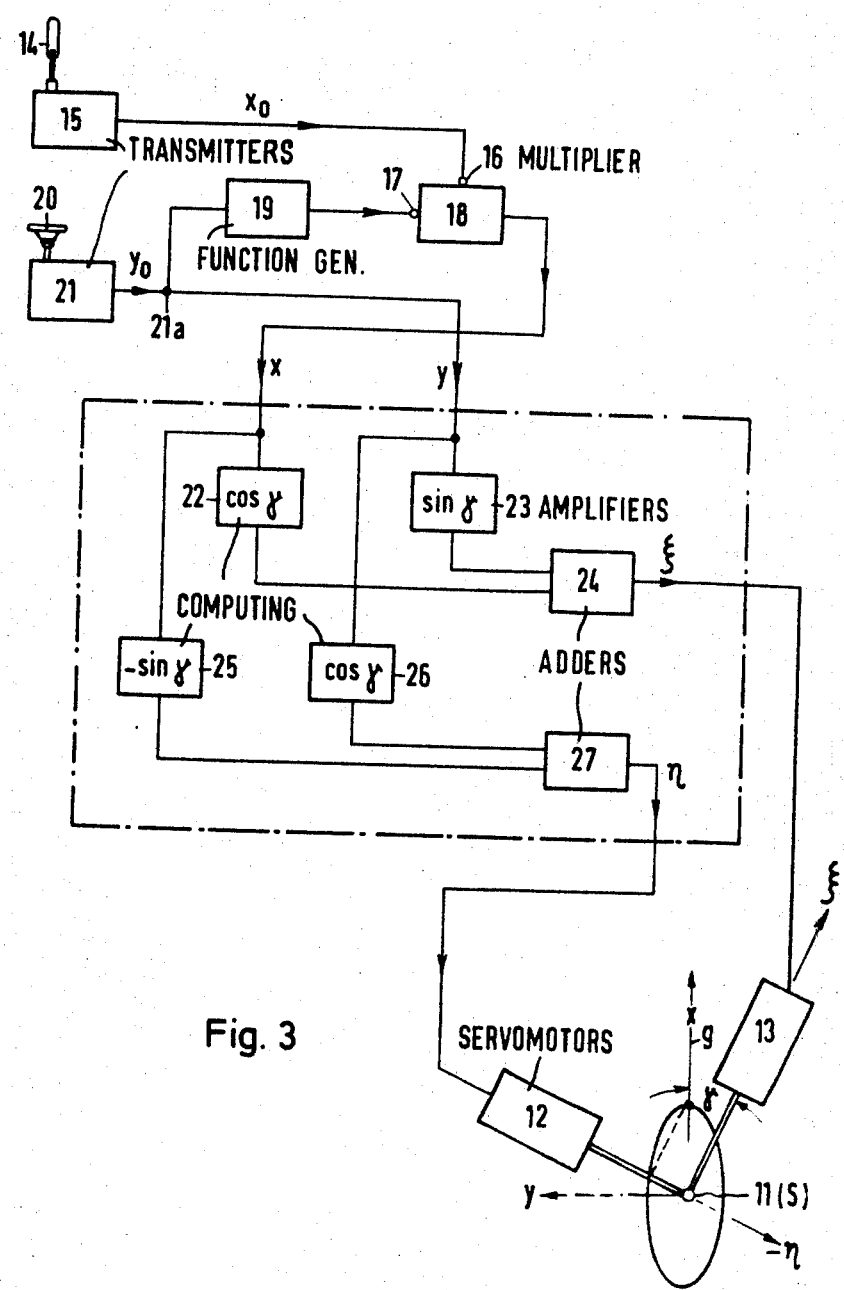
FIG. 3 is a block diagram of another embodiment of the control system of the invention.

In loading of the drive motor 8, it is advantageous if the resultant R of the eccentricities describes an ellipse, as show in FIG. 3. To accomplish this, the function generator 19 is designed so that its output signal varies in dependence upon the rudder angle signal $y_o$ according to the function $\sqrt{1 - y_o^2}$. In this manner, the control signal $x$ for the speed is computed from the control quantity $y_o$ for the rudder motion and the quantity $x_o$ preset by the speed control lever 14, where $$x = x_o \sqrt{1 - y_o^2}$$

applies. In the control system of the invention, other relations, for example, according to a parabolic function, may also be realized in a simple manner.

As shown in FIG. 3, in one embodiment of the invention, there are included in the first and second control connections between the speed control lever 14 and the steering wheel 15 and the servo motors 12 and 13, respectively, computers, particularly computer amplifiers 22, 23, 25 and 26, and adders 24 and 27, for computing the relations $$\zeta = x \cos \gamma + y \sin \gamma \text{ and}$$

$$\eta = -x \sin \gamma + y \cos \gamma$$

In this manner the coordinate system of the servo motors 12 and 13 may be rotated by any desired angle relative to the eccentricities required for a straight-ahead course g. The servo motors 12 and 13 may thus be installed in any direction relative to the ship's longitudinal axis, so that the position relative to the drive shaft can always remain the same. Different designs of the housing therefore become unnecessary, and the directions of the vectors may be adjusted subsequently on the completely installed propeller by setting another angle into the computer amplifiers 22, 23, 25 and 26, corresponding to the actual conditions.

The servo motors 12 and 13 for adjusting the eccentricities are connected in the first and second control connections or circuits and the components $\zeta$ and $\eta$ are fed as reference values to the controls of the first and second servo motors, respectively. The actual value is formed in each case by the component $R_x$ and $R_y$, respectively, measured in the direction of the respective servo motor, of the total eccentricity R (FIG. 1).

The control system of the invention has the following advantageous embodiments:

a. Power limitation for the drive motor:

A signal transmitter at the control rod of the injection pump of the Diesel engine used as the drive motor reduces the power consumption of the propeller to a predetermined value through eccentricity control in accordance with the invention, with the interposition of computer circuitry.

b. Optimizing the speed of the drive motor by the eccentricity or blade position of the propeller:

By simultaneous control of the speed rotation adjustment and the eccentricity of the propeller from the speed transmitter via function generators an optimum overall efficiency may be achieved for any load.

c. Call-up of programs for emergency maneuvers which are necessary, for example, in the event of oil shortage or excessive heating of oil:

In extreme cases, recording sensors can cause a reduction of the eccentricity down to zero. In the case of extreme heeling, which is measured by a heeling sensor, eccentricities in the transverse direction may be initiated automatically, which cause the ship to turn. Heeling may also occur due to too much transverse pull of a tug or transverse sea motion. The ship is turned automatically with her bow against the heeling angle, in the case of transverse sea motion, against the maximum heeling angle. The forward speed command is automatically set to zero. To initiate this emergency maneuver, the time derivative of the heeling angle may also be used, in addition to the angle itself.

d. Immediate utilization of ocean vessel guidance:

If there is remote control from the ocean-going vessel to the individual tugs with answering provision, the commands may be given by the ocean-going vessel, and only the maximum permissible limits, the so-called leeway, is continuously preset at the tug.

e. Optimization of deceleration and acceleration processes:

The change in time of the pitch may be controlled by a timing circuit, the dynamics of which must be determined by suitable tests, in such a manner that the permissible intermittent overload rating of the drive motor is not exceeded and the flow at the blades does not separate. The timing circuit is influenced by the instantaneous overload capacity of the drive motor. This is adaptive control.

f. In order to keep a floating platform such as, for example, a drilling vessel or crane, in a given position, the eccentricities for the longitudinal and transverse forces may be automatically controlled by position sensors and gyros in such a manner that the forces supplied counteract the position deviation. This is dynamic positioning. Course control of a ship may readily be realized in a similar manner.

Figure 4:
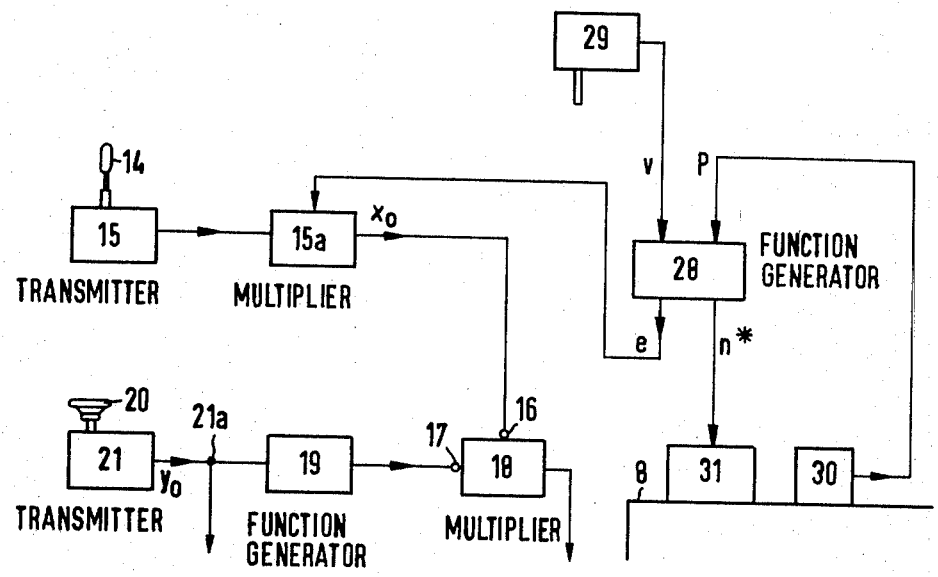
FIG. 4 is a block diagram of still another embodiment of the control system of the invention.

In the embodiment of FIG. 4, another control connection is included with those of the aforedescribed embodiments. In FIG. 4, a function generator 28 is supplied with input data comprising the ship's speed v, measured by a speed measuring device 29, and the power P of the drive motor 8, measured by a power measuring device 30.

The function generator 28 calculates the relation between the ship's speed $v$ and the driving power P, as input data, and the datum or reference speed $n^*$ of the drive motor 8, as well as the eccentricity of the propeller, as output data, whose total effectivenss or efficiency is a maximum. The datum or reference speed data $n^*$ is supplied to a speed regulator 31 of the drive motor 8. The data $e$, of the eccentricity of the propeller is supplied to a multiplier 15a which is connected to the output of the first electrical signal transmitter 15.

In a similar manner, it is possible to provide a control connection according to the invention with other control or regulating circuits, for example, for direct utilization in ship's or ocean-going vessel guidance, during tug operation.

While the invention has been described by means of specific examples and in a specific embodiment, we do not wish to be limited thereto, for obvious modifications will occur to those skilled in the art without departing from the spirit and scope of the invention.

We claim:

1. A control system for a cycloid propeller having pivoted blades having a control pint, first and second servo motors, a speed control lever controlling the first servo motor and a steering wheel controlling the second servo motor to adjust the position of the control point of the blades in two directions, said control system comprising a first control connection between the lever and the first servo motor, control connection including a first signal transmitter for producing a first signal; a second control connection between the wheel and the second servo motor, the second control connection including a second signal transmitter for producing a second signal; a function generator for controlling the first signal as a function of the function generator; and means for supplying the second signal to the function generator.

2. A control system as claimed in claim 1, wherein the first control connection includes a multiplier having one input connected to the first signal transmitter and another input coupled to the second signal transmitter via the function generator.

3. A control system as claimed in claim 1, wherein each of the first and second servo motors has an axis and the blades have a direction of eccentricities for a straight ahead course, and wherein the first control connection includes computer means and the second control connection includes computer means for computing the relations $x \cos \gamma + y \sin \gamma$ and $- x \sin \gamma + y \cos \gamma$ wherein $\gamma$ is the angle between the axis of one of the first and second servo motors and the direction of eccentricities for a straight ahead course.

4. A control system as claimed in claim 2, further comprising another control connection.

* * * * *